(12) United States Patent
Basheer et al.

(10) Patent No.: US 9,079,161 B2
(45) Date of Patent: Jul. 14, 2015

(54) CATALYST FOR ELECTROCHEMICAL DECHLORINATION OF HYDROCARBONS

(71) Applicant: KING FAHD UNIVERSITY OF PETROLEUM AND MINERALS, Dhahran (SA)

(72) Inventors: Chanbasha Basheer, Karimangalam (IN); Abdulelah Ahmed Ali Thabet, Sana'a (YE)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 78 days.

(21) Appl. No.: 14/024,507

(22) Filed: Sep. 11, 2013

(65) Prior Publication Data

US 2015/0068916 A1   Mar. 12, 2015

(51) Int. Cl.

| | |
|---|---|
| *B01J 21/08* | (2006.01) |
| *B01J 23/42* | (2006.01) |
| *B01J 37/00* | (2006.01) |
| *A62D 3/34* | (2007.01) |
| *A62D 3/115* | (2007.01) |
| *B29C 59/10* | (2006.01) |
| *C07C 17/23* | (2006.01) |
| *B01J 21/18* | (2006.01) |
| *C25B 3/00* | (2006.01) |

(52) U.S. Cl.
CPC *B01J 23/42* (2013.01); *B01J 21/18* (2013.01); *C25B 3/00* (2013.01)

(58) Field of Classification Search
USPC .......... 502/233, 258, 262; 423/333, 334, 338; 588/302, 316; 204/168

IPC .. A62D 3/34,3/115; B29C 59/10; B01J 21/063, B01J 21/08, 23/42, 13/0052, 13/0069, 37/00; C07C 17/23

See application file for complete search history.

(56) References Cited

U.S. PATENT DOCUMENTS

| | | | | |
|---|---|---|---|---|
| 3,511,601 | A | * | 5/1970 | Bieler et al. ............... 423/206.1 |
| 4,659,443 | A | * | 4/1987 | Byker ........................... 588/303 |
| 4,702,804 | A | * | 10/1987 | Mazur et al. ................ 588/303 |

(Continued)

FOREIGN PATENT DOCUMENTS

WO    2004/073600    *  9/2004

OTHER PUBLICATIONS

"Synthesis and characterization of a mesoporous HMS and its use as support of platinum catalysts," Nancy Martin et al. Reac. Kinet. Mech. Cat. (2010), 101, pp. 491-500.*

(Continued)

*Primary Examiner* — Patricia L Hailey
(74) *Attorney, Agent, or Firm* — Richard C Litman

(57) ABSTRACT

The catalyst for electrochemical dechlorination of hydrocarbons, such as chlorobenzenes, is a d-block transition metal supported by rice husk ash (RHA), preferably rice husk ash-supported platinum or titanium. The catalysts are prepared from rice husk ash by the sol-gel method. In order to dechlorinate chlorinated organic compounds, such as 1,4-dichlorobenzene, 1,2-dichlorobenzene, 1,3-dichlorobenzene, and 1,2,4-trichlorobenzene, a capillary microreactor is at least partially filled with the d-block transition metal supported by rice husk ash catalyst, a buffer solution having a pH preferably between 7 and 10, and the chlorinated organic compound. An electrical potential of approximately 3 kV is then applied across the capillary microreactor to initiate the dechlorination reaction.

13 Claims, 5 Drawing Sheets

(56) References Cited

U.S. PATENT DOCUMENTS

| | | | |
|---|---|---|---|
| 4,749,817 A | 6/1988 | George et al. | |
| 5,282,936 A * | 2/1994 | Rolison et al. | 205/446 |
| 5,569,809 A * | 10/1996 | Gui | 588/303 |
| 5,611,936 A * | 3/1997 | Fernando et al. | 210/747.8 |
| 5,625,110 A | 4/1997 | Schoedel et al. | |
| 6,375,735 B1 * | 4/2002 | Stephens et al. | 106/600 |
| 2005/0113610 A1 | 5/2005 | Sakurai et al. | |
| 2007/0009416 A1 * | 1/2007 | Withiam et al. | 423/338 |
| 2012/0048777 A1 * | 3/2012 | Derr et al. | 208/120.01 |

OTHER PUBLICATIONS

"Characterization of platinum—iron catalysts supported on MCM-41 synthesized with rice husk silica and their performance for phenol hydroxylation," Jitlada Chumee et al. Sci. Technol. Adv. Mater 10 (2009), pp. 1-6.*

"Utilization of tin and titanium incorporated rice husk silica nanocomposite as photocatalyst and adsorbent for the removal of methylene blue in aqueous medium," Farook Adam et al. Applied Surface Science 264 (2013), pp. 718-726.*

Basheer, Chanbasha et al., "Design of a Capillary-Microreactor for Efficient Suzuki Coupling Reactions," Tetrahedron Letters, 45(39), 7297-7300, 2004.

Mackenzie, Katrin et al., "Hydrodehalogenation of Halogenated Hydrocarbons in Water With Pd Catalysts: Reaction Rates and Surface Competition," Applied Catalysis B: Environmental, 63(3-4), 161-167, 2006.

Adam, Farook et al., "Rice Husk Ash Silica as a Support Material for Ruthenium Based Heterogenous Catalyst," Journal of Physical Science, 17(2), 1-13, 2006.

* cited by examiner

CATALYST FOR ELECTROCHEMICAL DECHLORINATION OF HYDROCARBONS

BACKGROUND OF THE INVENTION

1. Field of the Invention

The present invention relates to dechlorination of organic compounds, and particularly to a catalyst for electrochemical dechlorination of hydrocarbons.

2. Description of the Related Art

Chlorinated hydrocarbons are a by-product of numerous processes of the chemical industry. Because of the high toxicity of these compounds, it is necessary to eliminate them from halogenated organic waste. For this purpose, both non-catalytic methods, such as treatment with metallic sodium, high temperature combustion, treatment with ultraviolet irradiation and adsorption methods, as well as catalytic methods have been used. The predominant catalytic methods are the heterogeneous catalytic methods, the hydrogenating dechlorination technique, and catalytic combustion.

The danger of forming dioxins and the combustion of valuable hydrocarbons are disadvantages of the catalytic combustion methods. For this reason, there has been greater emphasis on methods for the hydrogenation disposal of chlorinated hydrocarbons. Conventional catalysts for the hydrogenating conversion of chlorobenzenes typically are based on nickel, rhodium, ruthenium or palladium. However, such conventional catalysts present problems in reactivation, high costs of the materials, and incomplete conversions, even at temperatures up to 250° C.

Thus, a catalyst for electrochemical dechlorination of hydrocarbons solving the aforementioned problems are desired.

SUMMARY OF THE INVENTION

The catalyst for electrochemical dechlorination of hydrocarbons, such as chlorobenzenes, are d-block transition metals supported by rice husk ash (RHA), preferably rice husk ash supported platinum or titanium. The catalysts are prepared from rice husk ash by the sol-gel method. In order to dechlorinate hydrocarbons, such as 1,4-dichlorobenzene, 1,2-dichlorobenzene, 1,3-dichlorobenzene, and 1,2,4-trichlorobenzene, a capillary microreactor is at least partially filled with the catalyst, a buffer solution having a pH preferably between 7 and 10, and the chlorinated organic compound. An electrical potential of about 3 kV is then applied across the capillary microreactor to initiate the dechlorination reaction.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The catalyst for electrochemical dechlorination of hydrocarbons, such as chlorobenzenes, is a d-block transition metal supported by rice husk ash (RHA), preferably rice husk ash-supported platinum or titanium. The catalyst is prepared from rice husk ash by the sol-gel method. The catalyst promotes the electrolysis of water, producing hydrogen, which displaces chlorine in halogenated hydrocarbons. In the experiments, 30 grams of clean rice husk was stirred in 750 mL of 1.0 M $HNO_3$ at room temperature for a period of 24 hours. The cleaned rice husk was then washed with copious amounts of distilled water to reach a constant pH, and then dried in an oven at 100° C. for another 24 hours. The dried, cleaned rice husk was then burned in a muffle furnace at 600° C. for approximately six hours to obtain white rice husk ash.

Approximately 3.0 grams of rice husk ash was added to 350 mL of 1.0 mol/L NaOH in a plastic container and stirred for 24 hours at room temperature to produce a sodium silicate solution. About 3.6 grams of cetyl trimethylammonium bromide (CTAB) was added to the sodium silicate solution and stirred to dissolve completely, the silicon to CTAB ratio being 1 to 1.2. This solution was titrated with 3.0 mol/L $HNO_3$ at a rate of about 1.0 mL/min with constant stirring until a constant pH of 3.0 was reached. The resultant gel was aged for five days, and then filtered and washed thoroughly with distilled water, followed by washing with acetone. The gel was dried at 110° C. for 24 hours and then ground to a fine powder. The powder was calcined at 500° C. in a muffle furnace for a period of five hours, yielding a rice husk ash-silica powder.

The same procedure as above was used to produce a rice husk-silica solution having 10.0 wt % platinum (in the form of $PtCl_2$), which was dissolved in 50 mL of 3 mol/L $HNO_3$ and titrated. Similarly, a solution having 10.0 wt % titanium (in the form of $TiO_2$) dissolved in 50 mL of 3 mol/L $HNO_3$ and titrated. The resultant gels were treated as described above. The synthesized rice husk ash-Pt and rich husk ash-Ti catalysts were characterized by x-ray diffraction, scanning electron microscopy and Fourier transform infrared spectroscopy.

Figure 6:
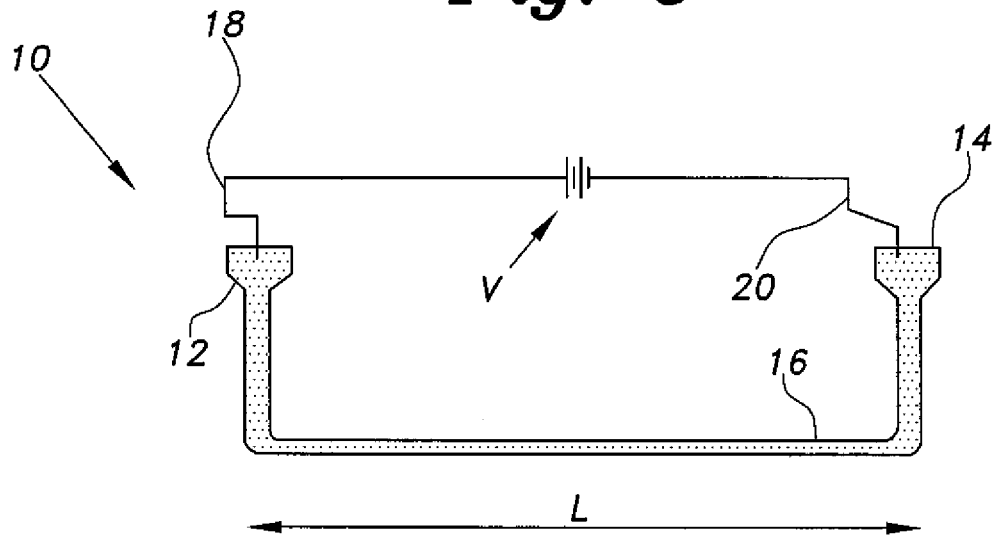
FIG. 6 is a diagram of a capillary microreactor used in the method of electrochemical dechlorination of hydrocarbons according to the present invention.

FIG. 6 diagrammatically illustrates a conventional capillary microreactor 10, including first and second reservoirs 12, 14 joined to one another by capillary reactor tube 16. Platinum wires 18, 20 are immersed in the reservoirs 12, 14, respectively, serving as electrodes for the transfer hydrogenolysis reaction. As will be discussed below in further detail, capillary reactor tubes of varying length L were used to compare conversion rates based upon differing lengths. In use, reservoirs 12, 14 and the capillary reaction tube 16 were filled with 2.5 mmol of buffer solution of varying pH values (2, 7 and 10, as will be discussed in further detail below), along with 12.5 mg of the catalyst and 100 μL of a mixture standard containing chlorobenzenes. It should be understood that any suitable type of mixture standard may be utilized, such as 8270 MegaMix® Standard, manufactured by the Restek Corporation of Bellefonte, Pa. In the experiments, the buffer solution, the catalyst and the mixture standard were all introduced into the microreactor 10 through the reservoir 12. High voltage provided by any suitable type of voltage source V is then applied across the platinum electrodes 18, 20. In the experiments, as will be discussed in greater detail below, potentials ranging between 1.0 kV and 5.0 kV were applied at a constant current of 200 μA. No air bubbles were found inside the capillary tube 16 during the reaction.

Figure 1:
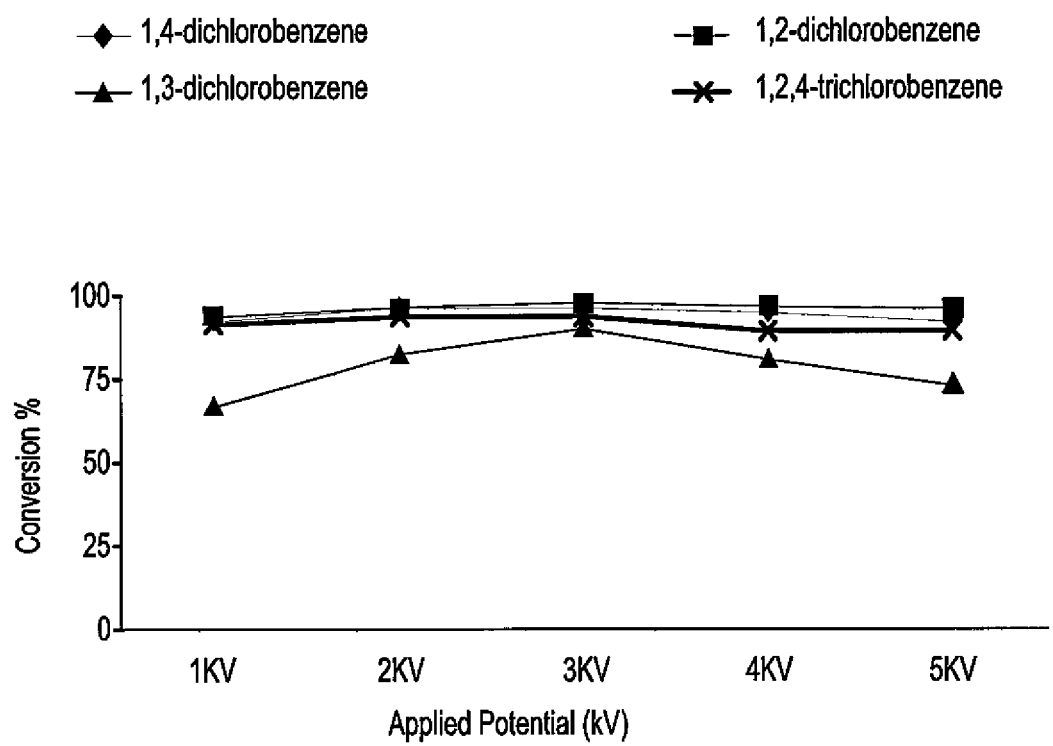
FIG. 1 is a graph showing chlorination conversion rates of differing chlorobenzenes as a function of applied potential in a method of electrochemical dechlorination of hydrocarbons according to the present invention.

FIG. 1 illustrates the results of the detoxification of chlorinated organic compounds (COCs) in the microreactor 10 for various applied potentials ranging between 1 kV and 5 kV at a constant current of 200 Dechlorination was tested in 1,4-dichlorobenzene, 1,2-dichlorobenzene, 1,3-dichlorobenzene, and 1,2,4-trichlorobenzene using both the platinum and titanium-based catalysts. As shown, for both catalysts, the maximum detoxification of COCs was found to occur at about 3 kV.

Figure 2:
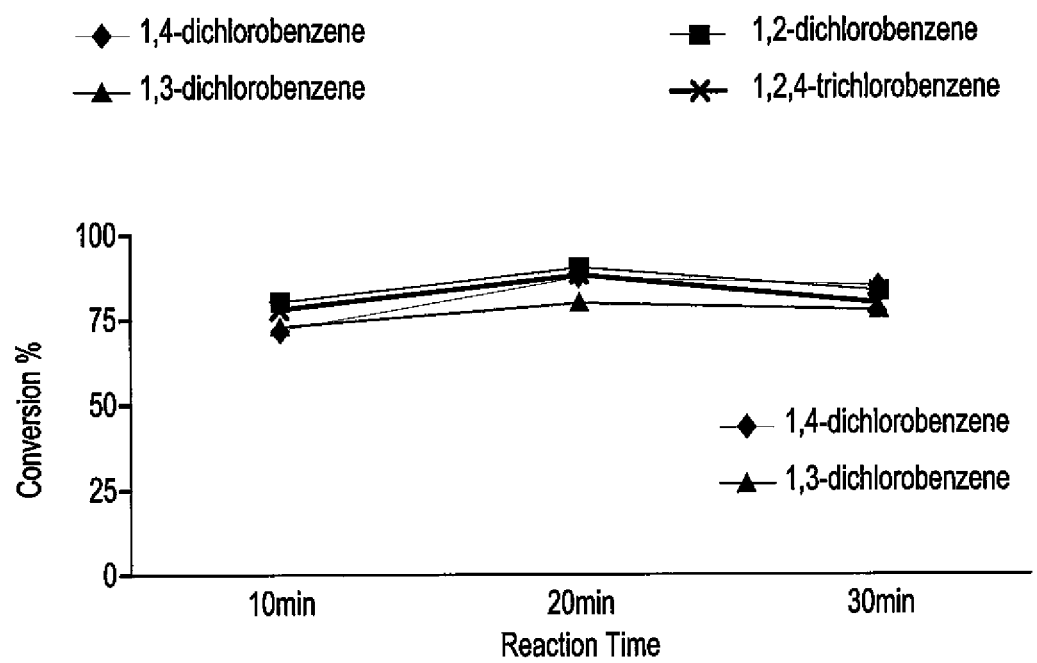
FIG. 2 is a graph showing chlorination conversion rates of the differing chlorobenzenes of FIG. 1 as a function of reaction time using a platinum-based catalyst in the method of electrochemical dechlorination of hydrocarbons according to the present invention.
Figure 3:
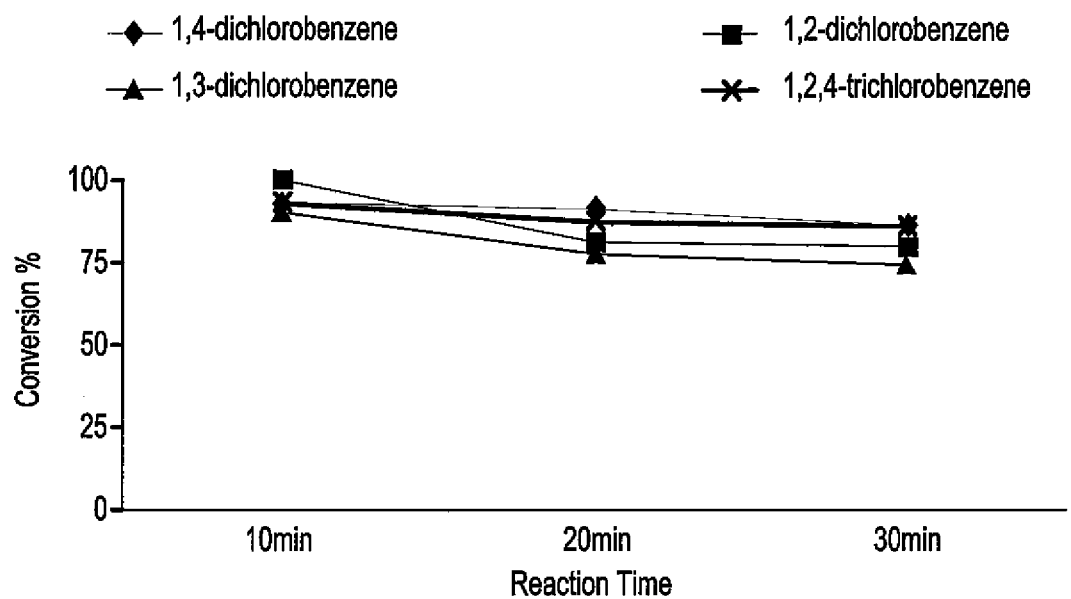
FIG. 3 is a graph showing chlorination conversion rates of the differing chlorobenzenes of FIG. 1 as a function of reaction time using a titanium-based catalyst in the method of electrochemical dechlorination of hydrocarbons according to the present invention.

FIGS. 2 and 3 illustrate the dechlorination reaction time for the chlorinated hydrocarbons of FIG. 1 using the platinum-based and titanium-based catalysts, respectively. As shown in FIG. 2, dechlorination is found to increase as reaction time increases, up to 20 min, using the rice husk ash-Pt catalyst at an applied potential of 3 kV and a pH of 7. As shown in FIG. 3, for the rice husk ash-Ti catalyst, optimal dechlorination occurs at about 10 min, also at an applied potential of 3 kV and at a pH of 10.

Variation in the length L of the reaction tube 16 was also studied. The results based upon lengths of 7 cm, 14 cm and 21 cm, are summarized in Table 1 below.

TABLE 1

Effect of Reactor Tube Length on Conversion Rate

| Compound | Conversion Rate (%) at 7 cm | Conversion Rate (%) at 14 cm | Conversion Rate (%) at 21 cm |
|---|---|---|---|
| 1,2-dichlorobenzene | 92 | 95 | 98 |
| 1,3-dichlorobenzene | 87 | 89 | 90 |
| 1,4-dichlorobenzene | 94 | 95 | 97 |
| 1,2,4-trichlorobenzene | 89 | 91 | 94 |

Figure 4:
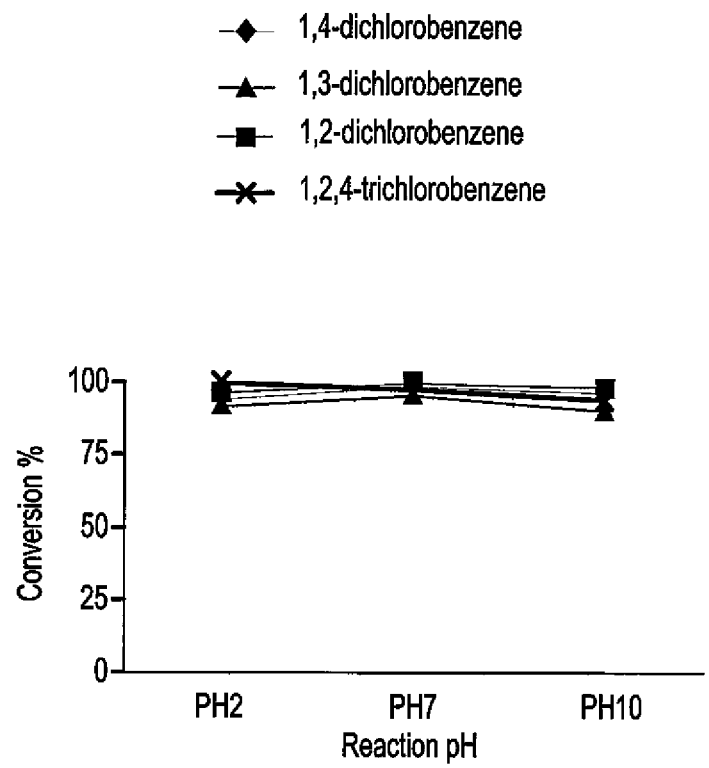
FIG. 4 is a graph showing chlorination conversion rates of the differing chlorobenzenes of FIG. 1 as a function of reaction pH using the platinum-based catalyst in the method of electrochemical dechlorination of hydrocarbons according to the present invention.
Figure 5:
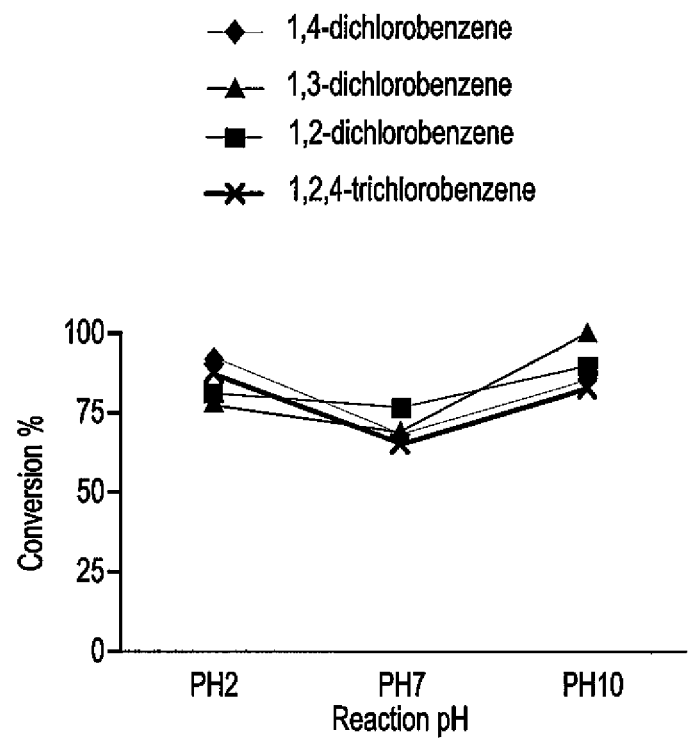
FIG. 5 is a graph showing chlorination conversion rates of the differing chlorobenzenes of FIG. 1 as a function of reaction pH using the titanium-based catalyst in the method of electrochemical dechlorination of hydrocarbons according to the present invention.

As shown, the highest conversion rates occur at the largest length of 21 cm. As is well known, microdevices using an electrophoretic separation at constant field typically have a resolution that is proportional to the square of the channel length. As shown in FIGS. 4 and 6, variations in pH in the solution were also studied for both the platinum-based and titanium-based catalysts, respectively. FIGS. 4 and 5 show the conversion rates for the same four chlorinated hydrocarbons studied in FIG. 1. The maximum conversion for the rice husk ash-platinum catalyst occurs in the neutral range (about pH 7), but in the rice husk ash-Ti catalyst, maximum conversion occurs in an alkaline range (about pH 10).

In order to examine the overall efficacy of the present catalysts, both were compared against a conventional catalytic hydrodechlorination reaction using an attractive abatement process for chlorinated organic wastes, specifically with a magnetically recoverable supported Pd(0) catalyst. The results are given below in Table 2, showing the evaluation of reaction yield with an optimum dechlorination reaction time of 20 minutes at a pH of 7 for the rice husk ash-Pt catalyst, and for a reaction time of 10 minutes at a pH of 7 for the rice husk ash-Ti catalyst. Both catalysts were used with an applied potential of 3 kV in a 21 cm long capillary microreactor tube. As shown, compared with the conventional detoxification method, the capillary microreactor provided high conversion ratios of chlorobenzenes in a relatively short time (10 min and 20 min) using only relatively small amounts of the reactant.

TABLE 2

Conversion Ratio Comparison

| | Method | | | | | | | |
|---|---|---|---|---|---|---|---|---|
| | Glass Capillary Microreactor | | Attractive Abatement Process Catalyst | | | | | |
| | RHA-Ti | RHA-Pt | RHA-Pt | | | RHA-Ti | | |
| Compound name | 10 min | 20 min | 2 hr | 16 hr | 24 hr | 2 hr | 16 hr | 24 hr |
| 1,3-dichlorobenzene | 93 | 97 | 100 | 100 | 95 | 86 | 93 | 100 |
| 1,2-dichlorobenzene | 100 | 98 | 58 | 100 | 100 | 78 | 95 | 91 |
| 1,4-dichlorobenzene | 91 | 90 | 49 | 92 | 91 | 88 | 100 | 75 |
| 1,2,4-trichlorobenzene | 93 | 94 | 48 | 76 | 96 | 80 | 93 | 89 |

It is to be understood that the present invention is not limited to the embodiments described above, but encompasses any and all embodiments within the scope of the following claims.

We claim:

1. A method of making a catalyst for electrochemical dechlorination of hydrocarbons, comprising the steps of:
   mixing rice husk ash with sodium hydroxide solution to form a sodium silicate solution;
   dissolving cetyl trimethylammonium bromide in the sodium silicate solution, wherein the cetyl trimethylammonium bromide to silicon molar ratio is about 1.2 to 1 to form an intermediate solution;
   dissolving approximately 10 wt % of $PtCl_2$ in 3 M $HNO_3$ to form a titrant and titrating with the intermediate solution with the titrant to form a gel;
   washing the gel;
   drying the gel;
   grinding the dried gel into a powder; and
   calcining the powder to form the catalyst for electrochemical dechlorination of hydrocarbons.

2. The method of making a catalyst for electrochemical dechlorination of hydrocarbons as recited in claim 1, further comprising the steps of:
   drying cleaned rice husks in an oven at a temperature of 100° C.; and
   burning the dried, cleaned rice husks in a furnace at a temperature of 600° C. to form the rice husk ash.

3. The method of making a catalyst for electrochemical dechlorination of hydrocarbons as recited in claim 2, wherein the step of drying the cleaned rice husks comprises drying the cleaned rice husks in the oven for a period of 24 hours.

4. The method of making a catalyst for electrochemical dechlorination of hydrocarbons as recited in claim 3, wherein the step of burning the dried, cleaned rice husks comprises burning the dried, cleaned rice husks in the furnace for a period of six hours.

5. The method of making a catalyst for electrochemical dechlorination of hydrocarbons as recited in claim 1, wherein the step of mixing the rice husk ash with the sodium hydroxide solution comprises mixing the rice husk ash with 1.0 M sodium hydroxide solution.

6. The method of making a catalyst for electrochemical dechlorination of hydrocarbons as recited in claim 5, wherein the step of mixing the rice husk ash with the sodium hydroxide solution further comprises stirring the mixture for a period of 24 hours.

7. The method of making a catalyst for electrochemical dechlorination of hydrocarbons as recited in claim 1, wherein the step of washing the gel comprises washing with distilled water and acetone.

8. The method of making a catalyst for electrochemical dechlorination of hydrocarbons as recited in claim 7, wherein the step of drying the gel comprises drying the gel at a temperature of 110° C. for a period of 24 hours.

9. The method of making a catalyst for electrochemical dechlorination of hydrocarbons as recited in claim 8, wherein the step of calcining the powder comprises calcining the powder at a temperature of 500° C. for a period of 24 hours.

10. A method of electrochemical dechlorination of hydrocarbons, comprising the steps of:
- at least partially filling a capillary microreactor with a buffer solution, the hydrocarbon to be dechlorinated, and a catalyst made from a d-block transition metal supported by rice husk ash; and
- applying an electrical potential across the capillary microreactor.

11. The method of electrochemical dechlorination of hydrocarbons as recited in claim 10, wherein the d-block transition metal is selected from the group consisting of platinum and titanium.

12. The method of electrochemical dechlorination of hydrocarbons as recited in claim 11, wherein the buffer solution has a pH in the range of 7 to 10.

13. The method of electrochemical dechlorination of hydrocarbons as recited in claim 10, wherein the step of applying the electrical potential across the capillary microreactor comprises applying an electrical potential of 3 kV across the capillary microreactor.

\* \* \* \* \*